(12) United States Patent
Taubmann et al.

(10) Patent No.: US 10,876,344 B2
(45) Date of Patent: Dec. 29, 2020

(54) CARRIER WITH PIVOTABLE CLAMPING PART AND ASSEMBLY METHOD

(71) Applicant: BROSE FAHRZEUGTEILE GMBH & CO. KOMMANDITGESELLSCHAFT, BAMBERG, Bamberg (DE)

(72) Inventors: Udo Taubmann, Bad Rodach-Suelzfeld (DE); Frank Wagner, Nuremberg (DE); Christian Salm, Bamberg (DE); Christian Jaeger, Bamberg (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 79 days.

(21) Appl. No.: 16/253,304

(22) Filed: Jan. 22, 2019

(65) Prior Publication Data

US 2019/0226261 A1   Jul. 25, 2019

(30) Foreign Application Priority Data

Jan. 22, 2018   (DE) .......... 10 2018 200 925

(51) Int. Cl.
| | |
|---|---|
| *B60J 1/16* | (2006.01) |
| *E05F 11/38* | (2006.01) |
| *E05F 11/48* | (2006.01) |

(52) U.S. Cl.
CPC .......... *E05F 11/385* (2013.01); *E05F 11/483* (2013.01); *E05F 2011/387* (2013.01); *E05Y 2201/612* (2013.01); *E05Y 2201/64* (2013.01); *E05Y 2201/684* (2013.01); *E05Y 2600/502* (2013.01); *E05Y 2900/55* (2013.01)

(58) Field of Classification Search
CPC ....... E05F 11/385; E05F 11/40; E05F 11/405; E05F 2011/387; E05Y 2201/64; E05Y 2600/502; E05Y 2900/55
USPC ..................................... 49/374, 375
See application file for complete search history.

(56) References Cited

U.S. PATENT DOCUMENTS

| | | | | |
|---|---|---|---|---|
| 4,866,895 A | * | 9/1989 | Hlavaty | ..................... B60J 1/17 52/208 |
| 5,546,704 A | * | 8/1996 | Maruoka | .................... B60J 1/17 49/375 |
| 5,692,273 A | | 12/1997 | Rodde | |

(Continued)

FOREIGN PATENT DOCUMENTS

| | | |
|---|---|---|
| DE | 19943717 A1 | 3/2001 |
| DE | 10005759 A1 | 8/2001 |

(Continued)

*Primary Examiner* — Jerry E Redman
(74) *Attorney, Agent, or Firm* — Brooks Kushman, P.C.

(57) ABSTRACT

It is provided a carrier for a vehicle window lifter comprising a pane holder that comprises two opposed clamping parts between which a gap is provided for receiving a portion of a window pane and which are to be connected to each other via at least one fastening element when the window pane is inserted into the gap. The pane holder forms a bearing portion for one of the clamping parts, on which a swivel axis for the one clamping part is defined, and a swivel element protruding into the gap is provided, by means of which the one clamping part is pivotable in the direction of the other clamping part about the swivel axis by inserting the window pane into the gap.

18 Claims, 10 Drawing Sheets

(56) References Cited

U.S. PATENT DOCUMENTS

| | | | | |
|---|---|---|---|---|
| 5,778,599 A * | 7/1998 | Saito | ........... | E05F 11/385 49/375 |
| 5,907,927 A * | 6/1999 | Lieb | ........... | B60J 1/17 49/375 |
| 5,966,872 A * | 10/1999 | Wasek | ........... | E05F 11/385 49/348 |
| 5,987,820 A * | 11/1999 | Shibanushi | ........... | B60J 1/17 49/375 |
| 5,992,099 A * | 11/1999 | Thomas | ........... | E05F 11/385 49/375 |
| 6,119,403 A * | 9/2000 | Klippert | ........... | E05F 11/382 49/375 |
| 6,152,636 A * | 11/2000 | Nass | ........... | B60J 1/17 403/13 |
| 7,596,908 B2 * | 10/2009 | Rothe | ........... | E05F 11/385 49/349 |
| 8,096,080 B2 * | 1/2012 | Pavlovic | ........... | E05F 11/382 49/348 |
| 2004/0107645 A1 * | 6/2004 | Galliani | ........... | E05F 11/382 49/375 |
| 2006/0130407 A1 * | 6/2006 | Castellon | ........... | E05F 11/385 49/375 |
| 2007/0006533 A1 * | 1/2007 | Dedrich | ........... | E05F 11/385 49/375 |
| 2008/0244981 A1 * | 10/2008 | Arimoto | ........... | E05F 11/385 49/352 |
| 2010/0043297 A1 * | 2/2010 | Barr | ........... | E05F 11/385 49/375 |
| 2010/0313481 A1 * | 12/2010 | Brownlie, Jr. | ........... | E05F 11/385 49/372 |
| 2013/0152476 A1 * | 6/2013 | Reno | ........... | E05F 11/385 49/348 |

FOREIGN PATENT DOCUMENTS

| | | |
|---|---|---|
| DE | 102004034144 A1 | 2/2005 |
| DE | 102005025281 A1 | 12/2005 |
| DE | 102008060407 A1 | 6/2010 |
| EP | 0694669 A1 | 1/1996 |
| EP | 2735682 A1 | 5/2014 |
| FR | 2830894 A1 | 4/2003 |
| GB | 2313873 A | 1/2001 |
| JP | H07257170 A | 10/1995 |
| JP | H08290717 A | 11/1996 |
| JP | 2003328640 A | 11/2003 |
| JP | 2004060372 A | 2/2004 |
| JP | 2007015585 A | 1/2007 |

* cited by examiner

CARRIER WITH PIVOTABLE CLAMPING PART AND ASSEMBLY METHOD

CROSS-REFERENCE TO RELATED APPLICATIONS

This application claims priority to German Patent Application No. 10 2018 200 925.2 filed on Jan. 22, 2018, the entirety of which is incorporated by reference herein.

BACKGROUND

The disclosure relates to a carrier for a vehicle window lifter and to a method for the assembly of a window pane on a carrier for a vehicle window lifter.

Carriers for vehicle window lifters known from the prior art usually are provided for the connection to a window pane to be adjusted in the region of a lower edge of the window pane or in the region of a lateral edge of the window pane. Such a carrier then for example is connected and adjustable via a flexible traction means of the vehicle window lifter, for example in the form of a Bowden cable, in order to lift or lower the window pane. Such carriers for example can be shiftably guided on a guide rail of the vehicle window lifter, but this is not absolutely necessary. In principle, such a carrier transmits an adjusting force, produced for example via an electromotive drive, to the window pane connected thereto, in order to adjust the window pane.

For the connection to the window pane it is known to provide two opposed clamping parts on the carrier, between which a gap is provided for receiving a portion of the window pane. Between these clamping parts the portion of the window pane inserted into the gap then can be fixed to the carrier. For example, at least one fastening element is provided for this purpose, in order to connect the two opposed clamping parts to each other and urge the same against the portion of the window pane inserted into the gap so that the portion is clampingly held between the clamping parts.

During the assembly of the window pane on such a carrier the problem can exist that the two clamping parts are unfavorably oriented to each other after the insertion of the window pane, so that the fastening element to be mounted thereafter for the connection of the two clamping parts and the fixation of the window pane to the carrier cannot easily be mounted free from a malposition. For the insertion of the window pane, the two clamping parts initially may be spaced apart from each other by a certain minimum measure so that the window pane or the portion provided therefor, for example on the pane lower edge, can easily be inserted into the gap between the two clamping parts. On assembly of the window lifter, however, merely one of the clamping parts usually is still accessible, for example from an inside of a vehicle door in which the vehicle window lifter is provided. A possible malposition of an outer clamping part from the inside then can hardly be corrected and can prevent or at least impede a correct screw connection of the two clamping parts to each other. Thus, a thread provided at the clamping parts can be damaged and lead to a failure of the vehicle window lifter in operation.

SUMMARY

Hence, one or more proposed solutions to provide a carrier and an assembly method in which the aforementioned difficulties when mounting a window pane to a carrier are avoided or at least reduced by two opposed clamping parts.

This may be is achieved both by a carrier with features as described herein and by an assembly method with features as described herein.

Accordingly, there is proposed a carrier for a vehicle window lifter that comprises a pane holder with two opposed clamping parts. Between the clamping parts a gap is provided for receiving a portion of a window pane, wherein the clamping parts are to be connected to each other via at least one fastening element, for example in the form of a screw or a bolt, when the window pane is inserted into the gap. In the proposed solution the pane holder furthermore forms a bearing portion for one of the clamping parts, on which a swivel axis for this one clamping part is defined. Furthermore, a swivel element protruding into the gap is provided, by means of which this one clamping part is pivotable about the swivel axis in the direction of the other clamping part by inserting he window pane into the gap.

Via the swivel element a kind of lever mechanism thus is provided on the carrier in order to pivot one of the clamping parts in the direction of the other, opposed clamping part along with the insertion of the window pane. Thus, on joining of the window pane the one clamping part is pivotable by means of the swivel element about the swivel axis defined on the bearing portion from a pre-assembly position into an assembly position. While in the pre-assembly position the two clamping parts are spaced apart from each other by a specified minimum measure and the one clamping part for example is tilted relative to the other clamping part in order to facilitate an insertion of a portion of the window pane into the gap, the two clamping parts in the assembly position are approached to each other in order to facilitate the assembly of the fastening element connecting the two clamping parts to each other. In the assembly position, for example, the clamping parts then are aligned substantially parallel to each other.

The swivel element protruding into the gap hence is equipped and provided to be displaced by the portion of the window pane properly inserted into the gap and to thereby pivot the one clamping part about the swivel axis specified by the bearing portion in the direction of the other clamping part (into the assembly position). In this way, for example a fastening opening provided on the one clamping part for the fastening element to be mounted can be aligned properly with a corresponding fastening opening on the other clamping part solely by inserting the window pane into the gap of the carrier. On a fastening opening of one clamping part or on both fastening openings of both clamping parts an internal thread for a screw bolt or for a fastening screw of the fastening element can be formed for example in one design variant. In one design variant, a threaded sleeve can non-rotatably be mounted in a fastening opening of a clamping part. This threaded sleeve then has an internal thread for a screw bolt or for a fastening screw of the fastening element.

In one design variant the swivel element is molded to the bearing portion. The swivel element thus is formed integrally with the bearing portion defining the swivel axis, for example of a plastic material.

Alternatively or in addition, the swivel element can be configured to pivot the one clamping part by elastic and/or plastic deformation of the bearing portion in the direction of the other clamping part upon insertion of the window pane into the gap formed between the clamping parts. On the bearing portion a deformability thus is selectively permitted due to the material and construction in order to specify a swivel axis and ensure pivoting of the one clamping part about this specified swivel axis on insertion of the window pane into the gap. Thus, the bearing portion is designed to be elastically and/or plastically deformable selectively in one region in order to thereby specify a swivel axis about which the one clamping part is pivoted during assembly by means of the swivel element displaced upon insertion of the pane.

In one design variant, the swivel element is disposed below the swivel axis based on an insertion direction along which the window pane can properly be inserted into the gap. The one clamping part to be pivoted hence can here be provided above the swivel axis of the bearing portion so that using a leverage effect of the swivel element displaced upon insertion of the window pane this clamping part is shifted in the direction of the opposed other clamping part.

In one design variant the bearing portion forms a bearing bracket defining a cutout, wherein the swivel element is arranged in the cutout of the bearing bracket. In the case of a U-shaped bearing bracket, the swivel element thus for example extends from a base of the bearing bracket into a cutout formed between two legs of the bearing bracket connected to each other via the base and at the same time protrudes into the gap of the carrier. The design with a bearing bracket for example provides for a targeted deformability in the region of the base connecting the two legs so that the swivel element molded to the base deforms the bearing bracket in the region of the base defining the swivel axis by displacing the portion of the window pane inserted into the gap and thereby pivots the one clamping part likewise integrally formed with the base in the direction of the other clamping part.

The swivel element can be configured pin- or cam-shaped for example.

The carrier in principle can comprise a carrier body to which at least a part of the pane holder is fixed, in particular attached or molded thereto, and which includes a guide portion for the shiftable guidance of the carrier on a guide rail of a vehicle window lifter. Thus, in particular the two opposed clamping parts can be fixed to the carrier body. In one design variant one of the clamping parts can be molded to the carrier body, while in particular a part of the pane holder including the other clamping part is attached to the carrier body. In the last-mentioned design variant it can be provided for example that a separately manufactured part—possibly made of another material than the carrier body—is mounted on the carrier body with the pivotable clamping part, to which carrier body the other clamping part in turn is molded as an integral component. The part mounted and attached to the carrier body here can also comprise the bearing element comprising the swivel element. In one design variant, for example, at least one protruding pin or web is formed for the attachment of a part formed separately of the carrier body and including the pivotable clamping part, which in the assembled condition of the then at least two-part carrier engages into a corresponding connecting opening of the properly attached part.

On the carrier body a connecting portion can be provided for the connection to a flexible traction means of the vehicle window lifter, for example in the form of a Bowden cable. Such a connecting portion then for example includes at least one nipple chamber for hanging in a cable nipple of a Bowden cable of the vehicle window lifter.

What is comprised by the proposed solution of course also is a vehicle window lifter for the adjustment of a window pane, which includes a carrier with a bearing portion defining a swivel axis for the one clamping part and a swivel element protruding into the gap between two clamping parts.

Furthermore, a further aspect of the proposed solution relates to a method for the assembly of a window pane on a carrier for a vehicle window lifter. For the proper assembly of the window pane on the carrier, a portion of the window pane, for example in the region of a pane lower edge, is inserted into a gap that is formed between two clamping parts of the carrier. Subsequently, the two clamping parts are connected to each other via at least one fastening element in order to fix the portion of the window pane received between the clamping parts to the carrier. On a bearing portion of the carrier a swivel axis is defined for one of the clamping parts, and by inserting the window pane into the gap the one clamping part is pivoted in the direction of the other clamping part about this swivel axis.

For carrying out the proposed assembly method a carrier according to any of the design variants explained above or below can of course be used. Features and advantages explained above and below for design variants of such a carrier thus also apply for design variants of a proposed assembly method, and vice versa.

In a variant of the assembly method it can be provided in particular that the portion of the window pane inserted into the gap acts on a swivel element of the bearing portion protruding into the gap, and the one clamping part thereby is pivoted in the direction of the other clamping part. Solely by properly inserting the window pane into the gap can a displacement of the one clamping part about the specified swivel axis be achieved.

For example, it is provided that after insertion of the window pane the fastening element is attached. The same for example can reach from the (second) unpivoted clamping part through a first fastening opening of this (second) clamping part into an opening in the window pane and reach into a second fastening opening of the (first) pivoted clamping part or also reach through this second fastening opening in order to connect the two (first and second) clamping parts to each other and fix the window pane to the carrier. For example, during the assembly of a vehicle window lifter in a vehicle door the clamping part to be pivoted faces an outside of the vehicle door and the other, unpivoted clamping part still is accessible from an inside of the vehicle door when the window pane is mounted on the vehicle window lifter premounted already on the vehicle door with the carrier. The insertion of the window pane into the gap between the two clamping parts thus leads to a displacement of the outer, hardly accessible clamping part and aligns this clamping part with respect to the other, inner clamping part for the following attachment of the at least one fastening element.

BRIEF DESCRIPTION OF THE DRAWINGS

The attached Figures by way of example illustrate possible design variants of the proposed solution.

DETAILED DESCRIPTION

A comparable carrier is known for example from DE 10 2005 025 281 A1. The carrier proposed herein includes a clamping part adjustably mounted via elastically deformable web connections in order to provide for a tilting movement of the window pane relative to a guide rail when the window pane is fixed to the carrier. The assembly problem described above, however, is not addressed in DE 10 2005 025 281 A1. What merely is considered here is the provision of a balancing tilting movement via a pane holder of the carrier.

FIGS. 1 to 8 and 9A to 11B show different views of design variants for a carrier 1 that for example can be used in a vehicle window lifter for a frameless vehicle door.

The carrier 1 has a carrier body 2 on which a guide portion 20 for the shiftable guidance of the carrier 1 on a guide rail of the vehicle window lifter (not shown in the Figures) is provided. Furthermore, a connecting portion 21 for the connection to a Bowden cable of the vehicle window lifter is provided on the carrier body 2. This connecting portion 21 therefor includes two nipple chambers into which cable nipples of the Bowden cable can be hung in order to be able to transmit an adjusting force to the carrier 1 via the Bowden cable or to adjust the same along the guide rail.

To specify an end position of the carrier 1, in which a window pane F connected to the carrier 1 is completely lowered, the carrier body 2 includes a stop 22 via which the carrier 1 can abut against a counter-stop, for example on the guide rail or a carrier component forming the guide rail or carrying the guide rail.

The carrier body 2 of the carrier 1 furthermore includes a holder portion 23 for fixing a pane holder 3 to the carrier body 2. For fixing the pane holder 3 to the carrier body 2 the pane holder 3 forms a connecting portion 32 which in particular carries clamping parts 3a and 3b and is enclosed by the holder portion 23 of the carrier body 2. The pane holder 3 of the carrier 1 with the clamping parts 3a and 3b is provided for a positive and clamping connection of the carrier 1 to the window pane F to be adjusted, which is partially shown in FIGS. 4 to 8.

The pane holder 3 forms the two opposed clamping parts 3a and 3b which between themselves define a gap g. Into this gap g a portion of the window pane F can be inserted properly in the region of its pane lower edge U and hence be arranged between the two clamping parts 3a and 3b. For fixing the window pane F to the carrier 1 a fastening element, here in the form of a screw 5, then is guided from one side through a fastening opening 35b on one of the clamping parts 3a, 4b, through a corresponding opening in the window pane F and inserted into a fastening opening 35a on the opposed clamping part 3a. On one or both clamping parts 3a, 3b an internal thread can be provided on a fastening opening 35a or 35b, into which an external thread of the screw 5 is turned. In a development, the internal thread can also be provided by a threaded sleeve arranged in a fastening opening 35a. For fixing such a threaded sleeve to the pivotable clamping part 3a a screw element, e.g. in the form of a helical gear 4, is to be attached to the one clamping part 3a (cf. in particular FIGS. 1 and 2). This helical gear 4—before inserting the window pane F and attaching the screw 5—is turned onto an end of the threaded sleeve protruding from a clamping part 3 in order to non-rotatably mount the threaded sleeve on the clamping part 3a via a head, e.g. with an external hexagon, positively retained in the fastening opening 35a.

For the assembly of the window pane F on the carrier 1 the two clamping parts 3a and 3b should be spaced apart from each other sufficiently and the gap g obtained between the same should be funnel-shaped, if possible. However, there is the problem that after an insertion of the window pane F into the gap g along an insertion direction E the two clamping parts 3a and 3b of the pane holder 3 possibly are not aligned with each other with their fastening openings 35a and 35b. This is all the more serious as during the assembly of the window pane F on the carrier 1, the carrier 1 already is usually pre-mounted on the vehicle window lifter in a vehicle door and hence the one, outer clamping part 3b no longer is easily accessible when the screw 5 is tightened on the inner clamping part 3b from the inside. A possible malposition of the two clamping parts 3a and 3b relative to each other or to a screw-in direction of the screw 5 then however prevents or at least impedes a correct screw connection. This in turn can lead to a damage of an internal thread into which the screw 5 is turned. The consequence hence is an increased risk for a failure of the carrier in operation of the vehicle window lifter.

In the illustrated carriers 1 of FIGS. 1 to 8 (and of FIGS. 9A to 11B) such a risk for a faulty screw connection is almost completely excluded by defining a swivel axis S on a bearing portion 30 of the pane holder 3 for the external (outer) clamping part 3a and by providing a swivel element 301 protruding into the gap g, such that the outer clamping part 3a is pivotable in the direction of the other, internal (inner) clamping part about the swivel axis S by inserting the window pane F into the gap g.

The bearing portion 30 formed with a U-shaped bearing bracket 300 here is formed integrally with the pivotable clamping part 3a and with the swivel element 301. A base of the bearing bracket 30 extending between two legs of the bearing bracket 300 defines the swivel axis S about which the one, outer clamping part 3a is pivoted in the direction of the other, inner clamping part 3b when the window pane F is mounted to the carrier 1 along the insertion direction E. The outer clamping part 3a here is arranged above the swivel axis S with respect to the downwardly pointing insertion direction E, the swivel element 301 protruding into the gap g below the swivel axis S. In the design variant shown in FIGS. 1 to 8 the swivel element 301 is designed pin-shaped with a bulged end portion and hence as a pivot pin 301. This pivot pin 301 furthermore is arranged within a cutout 3000 of the bearing bracket 300 in order to ensure a displaceability of the pivot pin 301 transversely to the insertion direction E of the window pane F.

The bearing portion 30 with the bearing bracket 300 is formed to be selectively deformable in the region of the base of the bearing bracket 300 defining the swivel axis S. In this way, the window pane F inserted into the gap g can deform the base of the bearing bracket 300 by displacing the pivot pin 301 protruding into the gap g. The displacement of the pivot pin 301 leads to a swivel movement of the pivot pin 301 and hence also of the outer clamping part 3a integrally formed therewith along a swivel direction R about the swivel axis S in the direction of the opposed, inner clamping part 3b. The outer clamping part 3a thus is displaced from a pre-assembly position in the direction of the opposed clamping part 3b into an assembly position solely by inserting the window pane F into the gap g about the swivel axis S and along the swivel direction R.

In the assembly position the outer clamping part 3a is properly aligned relative to the inner clamping part 3b so that a screw connection via the screw 5 and the helical gear 4 can be effected by avoiding a malposition of the two clamping parts 3a and 3b relative to each other.

Via the bearing portion 30 of the pane holder 3 a kind of lever mechanism thus is provided on the carrier 1 in order to pivot the outer clamping part 3a in the direction of the other, inner clamping part 3b on joining of the window pane F. Since for this purpose a deformation on the bearing portion 30 in the region of the specified swivel axis S selectively is permitted, the outer clamping part 3b therefor need not be supported with great expenditure. The pivotability of the outer clamping part 3a by displacement of the pivot pin 301 on insertion of the window pane F is achieved solely by the shape and the material of the pane holder 3.

Figure 1:
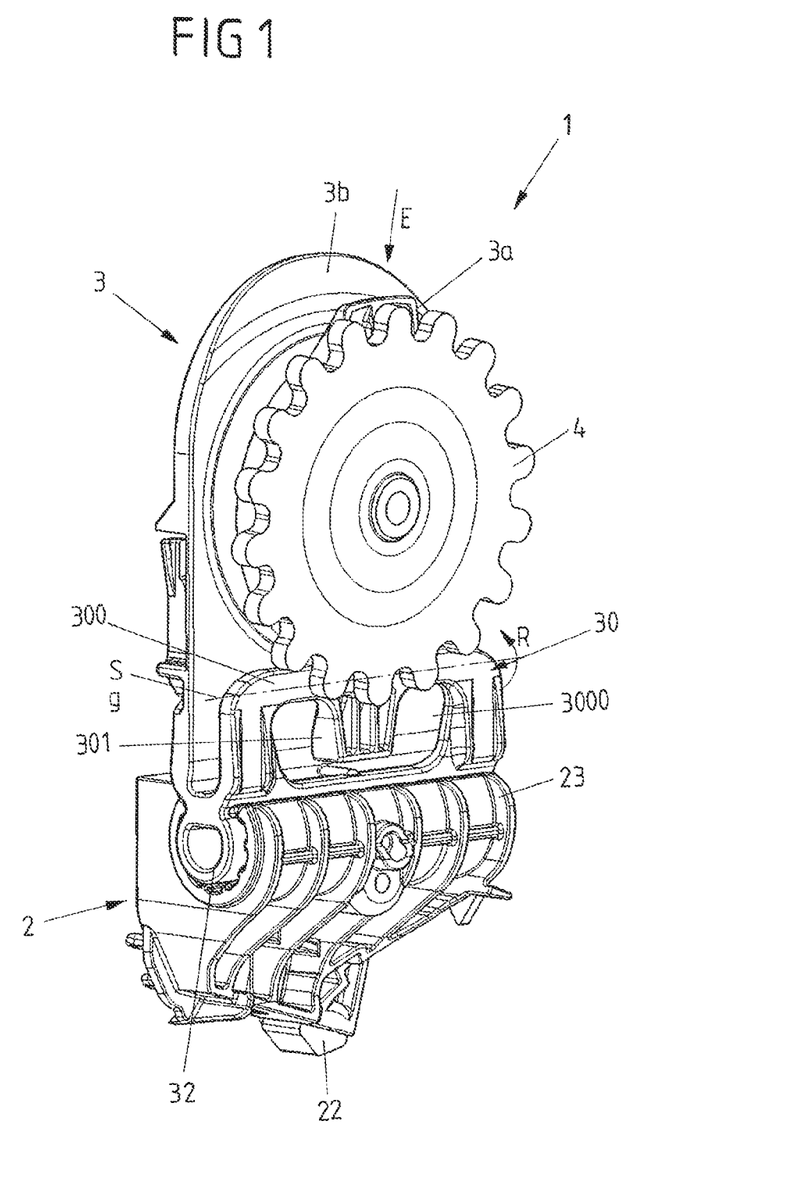
FIG. 1 shows a perspective view of a design variant of a proposed carrier.
Figure 2:
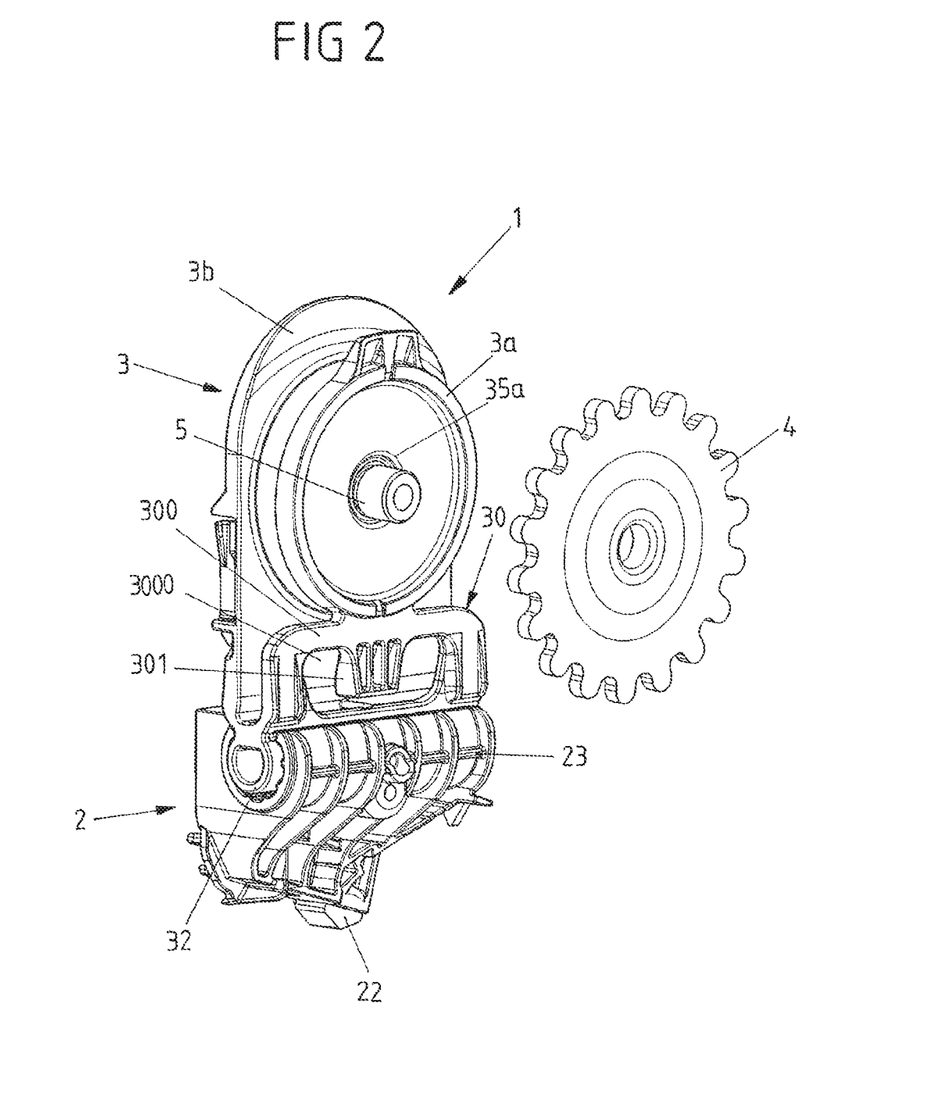
FIG. 2 likewise shows a perspective view of the carrier in a partly exploded representation.
Figure 3:
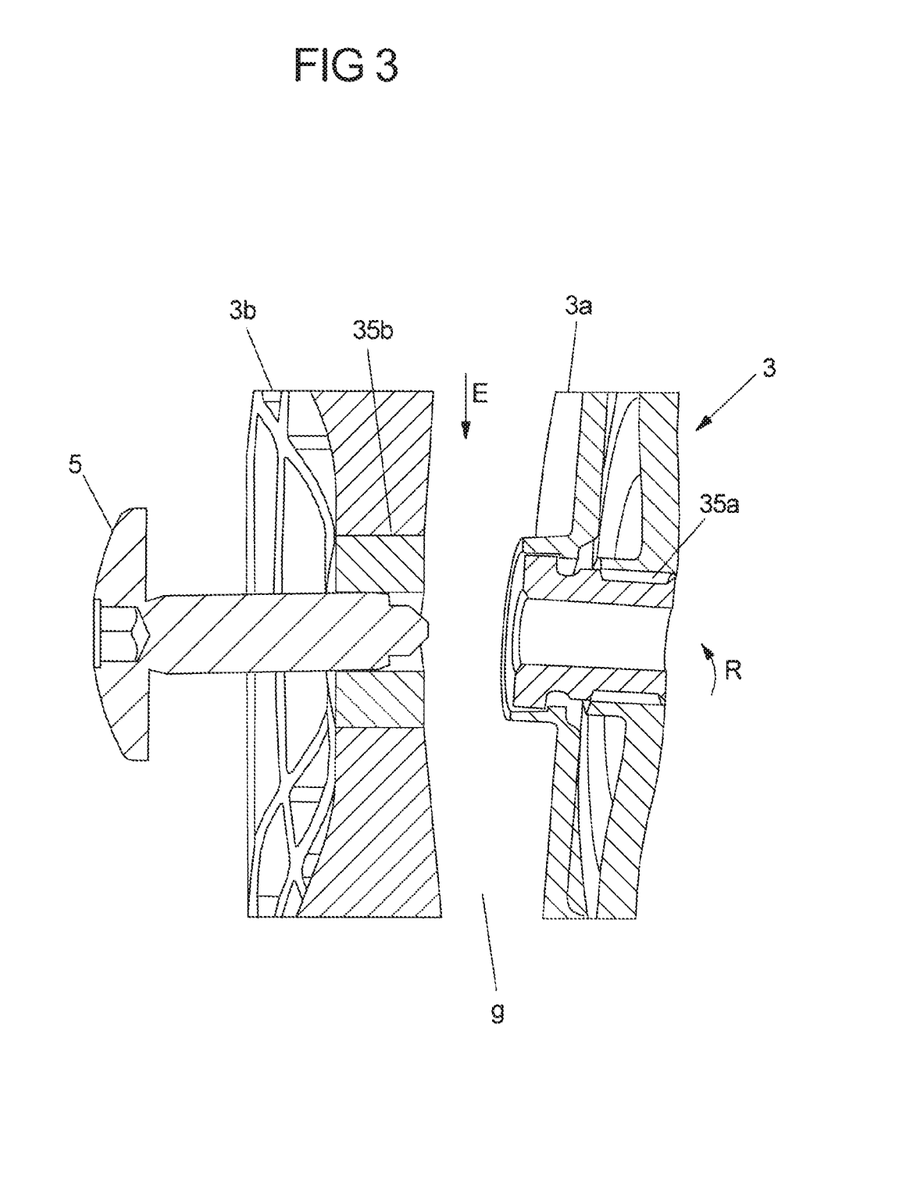
FIG. 3 partially shows a sectional view of the carrier with two clamping parts spaced apart from each other and with a fastening element provided for the connection of the two clamping parts to each other.
Figure 4:
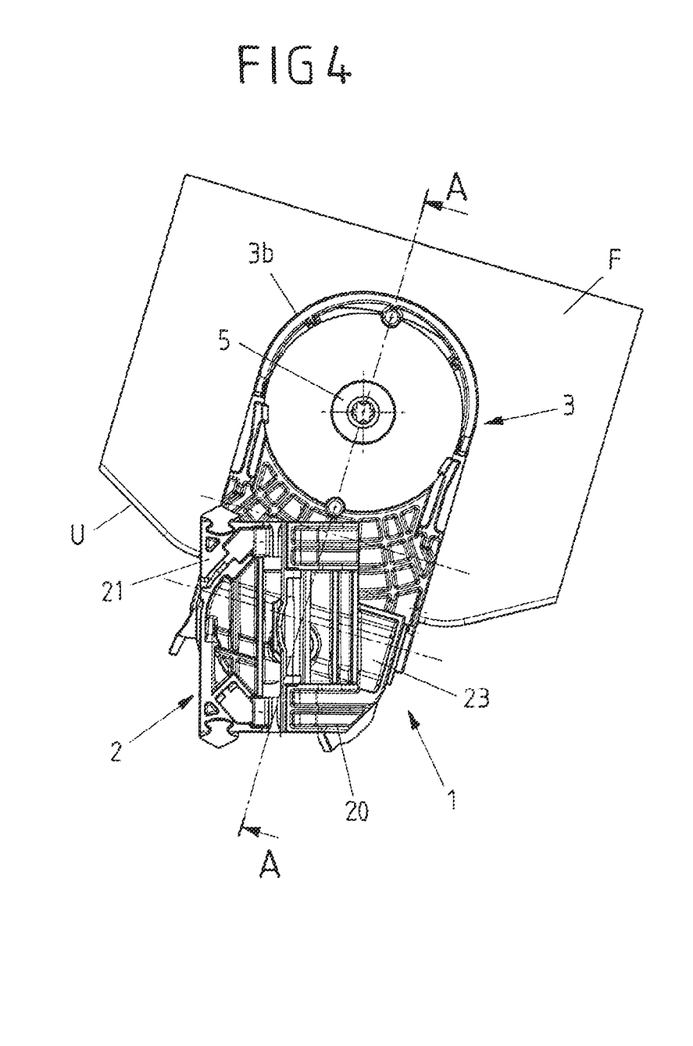
FIG. 4 partially and in a side view shows the carrier with a window pane fixed thereto.
Figure 4A:
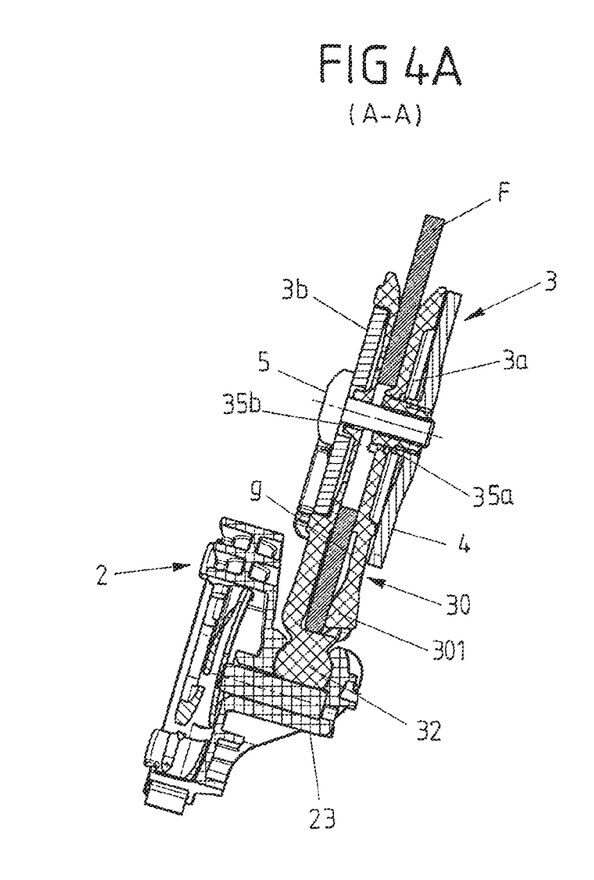
FIG. 4A shows a sectional view along the sectional line A-A of FIG. 4.
Figure 5:
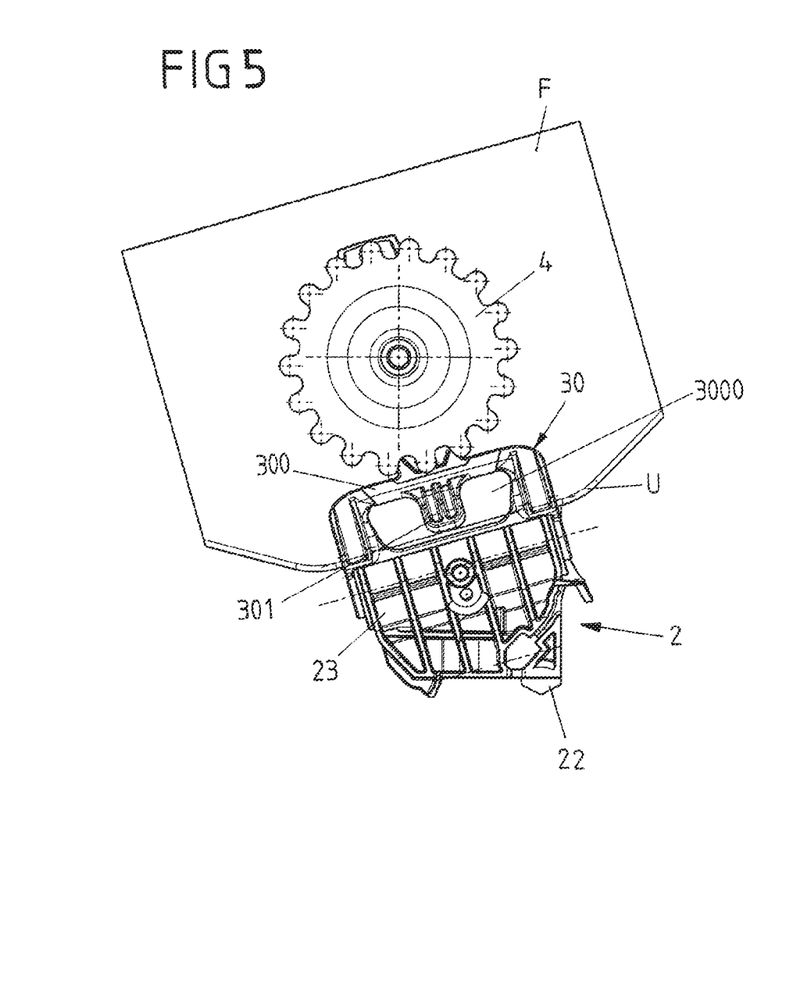
FIGS. 5-8 show different views of the carrier with the window pane fixed thereto.
Figure 6:
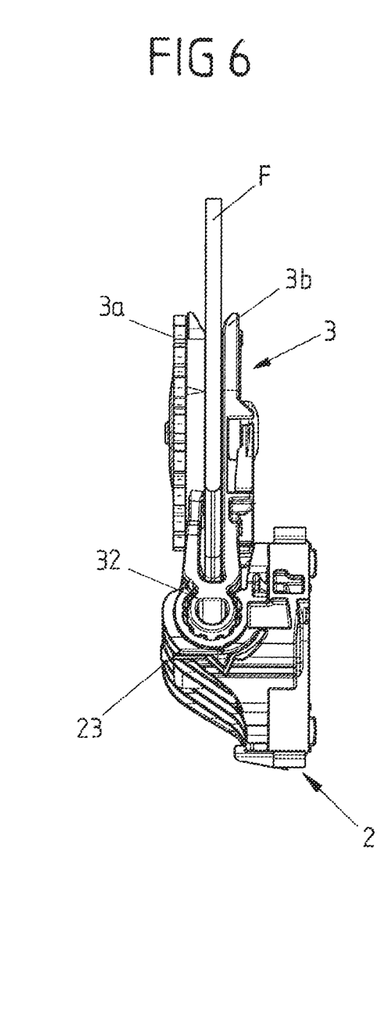
Figure 7:
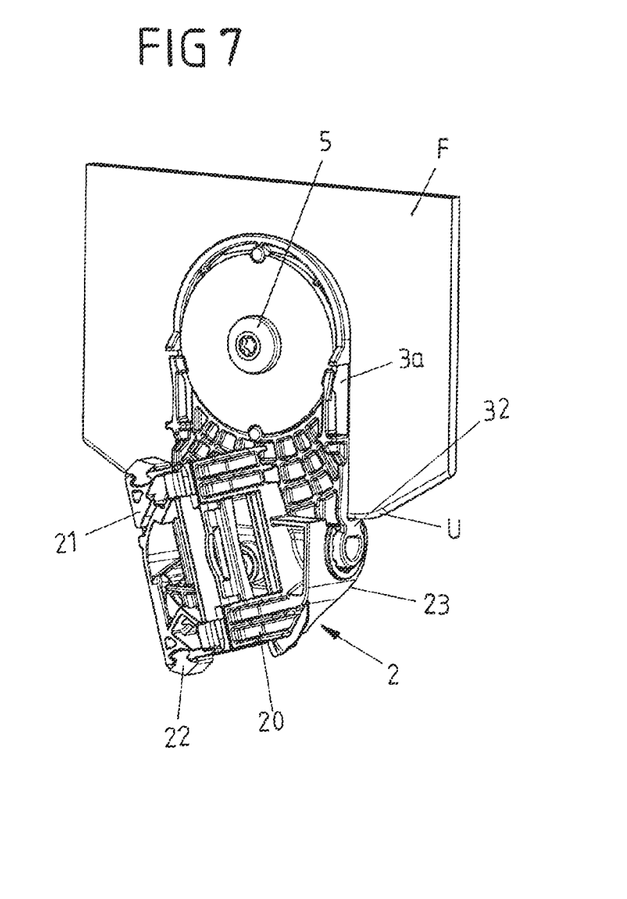
Figure 8:
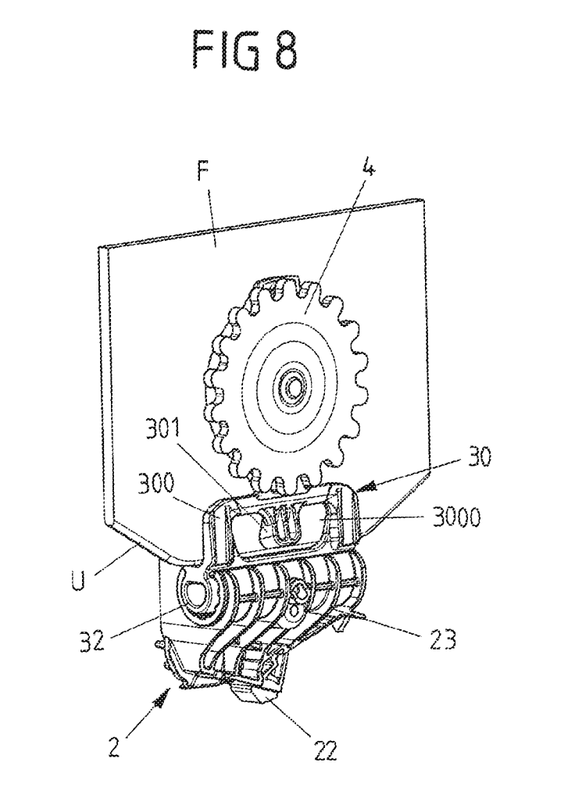
Figure 9A:
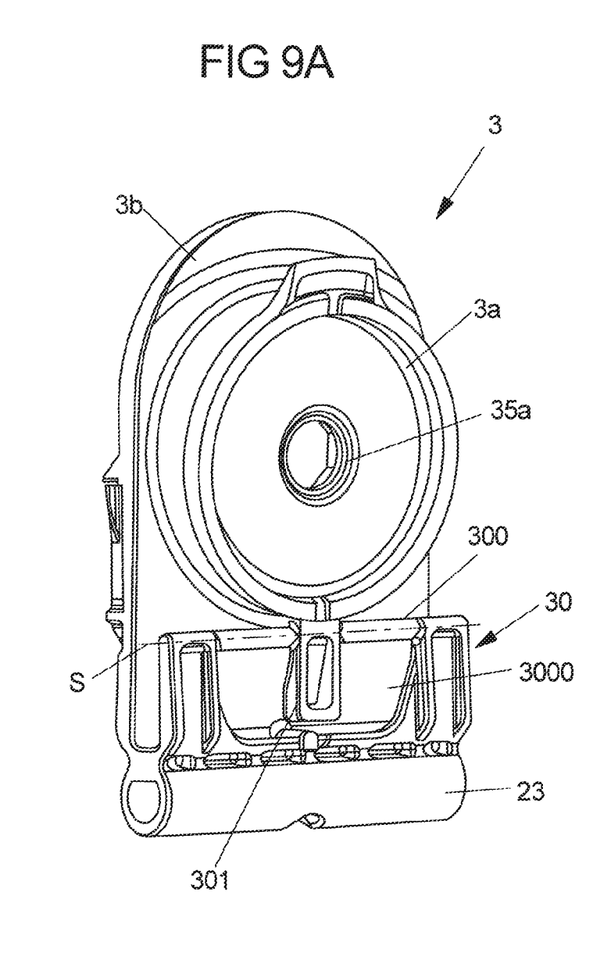
FIGS. 9A-9C show different views of a further design variant of a proposed carrier with a differently constructed bearing portion for pivoting one of the clamping parts in the direction of the other clamping part of the carrier triggered by the assembly of the window pane on the carrier.
Figure 9B:
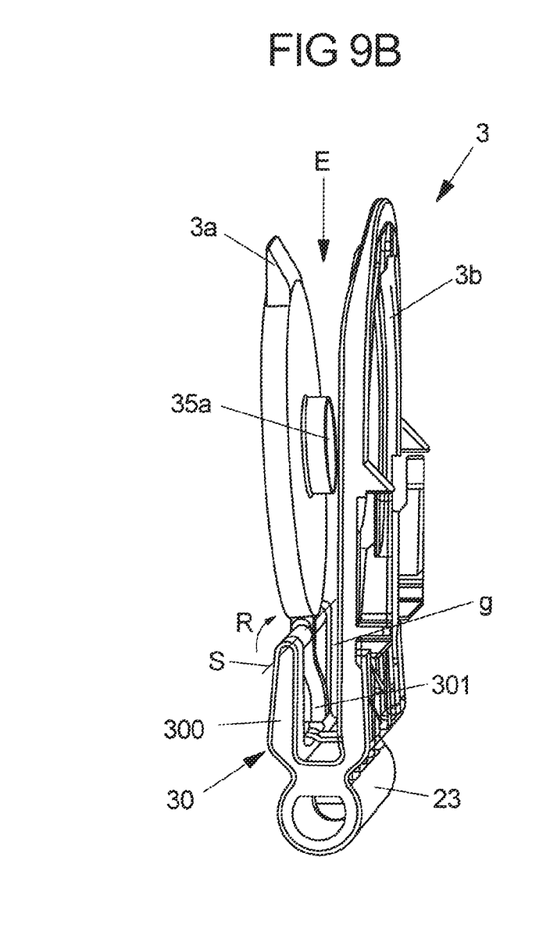
Figure 9C:
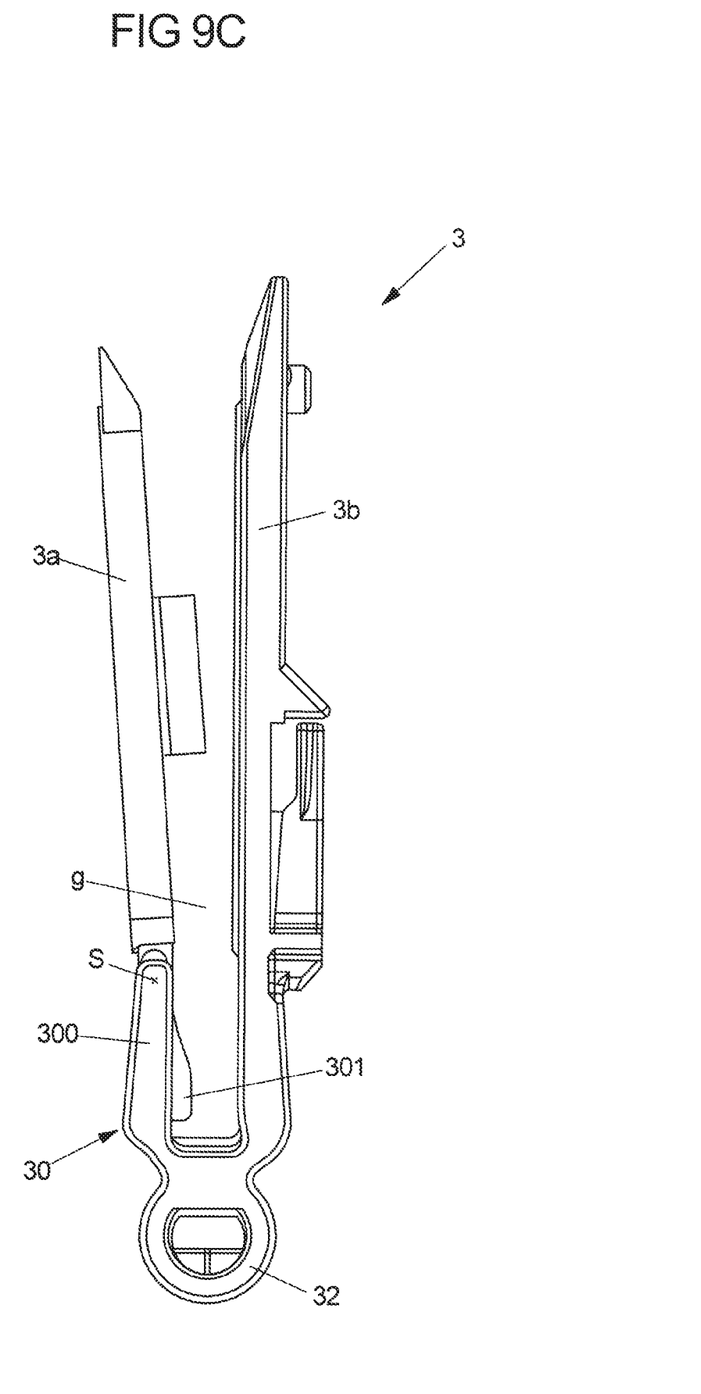

FIGS. 9A, 9B and 9C show different views of a further design variant for a pane holder 3 and hence for a carrier 1 that is formed with this pane holder 3 and a carrier body 2 not shown in FIGS. 9A to 9C.

Even in the design variant of FIGS. 9A to 9C a bearing portion 30 with a bearing bracket 300 and a pivot pin 301 is provided in order to ensure a pivotability of the outer clamping part 3a. The base of the bearing bracket 300 of the bearing portion 30 in contrast to the design variant of FIGS. 1 to 8 is formed with less rigidity in order to allow an elastic deformation of this base and hence of the bearing portion 300, when the window pane F inserted into the gap g with its pane lower edge U displaces the pivot pin 301 below the swivel axis S and the outer clamping part 3a thereby is displaced along the swivel direction R in the direction of the opposed inner clamping part 3b.

Figure 10A:
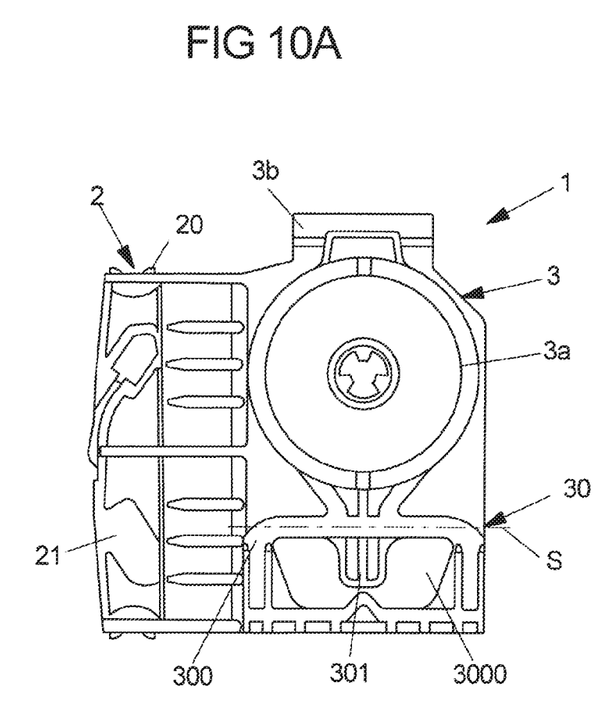
FIGS. 10A-10B show a further design variant of a proposed carrier, in which a pane holder with its two clamping parts is molded to a carrier body.
Figure 10B:
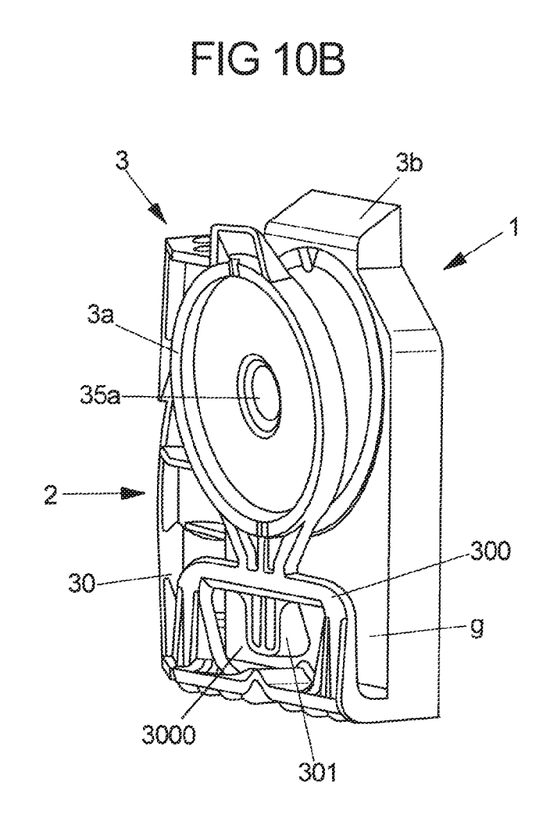

FIGS. 10A and 10B show two different views of a further design variant of a proposed carrier 1 in which the pane holder 3 is molded to the carrier body 2. The guide portion 20 and the connecting portion 21 of the carrier body 2 are located laterally beside the one (fixed) clamping part 3b of the pane holder 3 and are formed integrally with the same. Furthermore, the bearing bracket 300 of the bearing portion 30 with the pivot pin 301 for pivotally mounting the other clamping part 3a and the other clamping part 3a are integrally molded to the carrier body 2. In the design variant of FIGS. 10A and 10B the carrier body 2 and the pane holder 3 hence are formed in one piece and thus made of the same material.

Figure 11A:
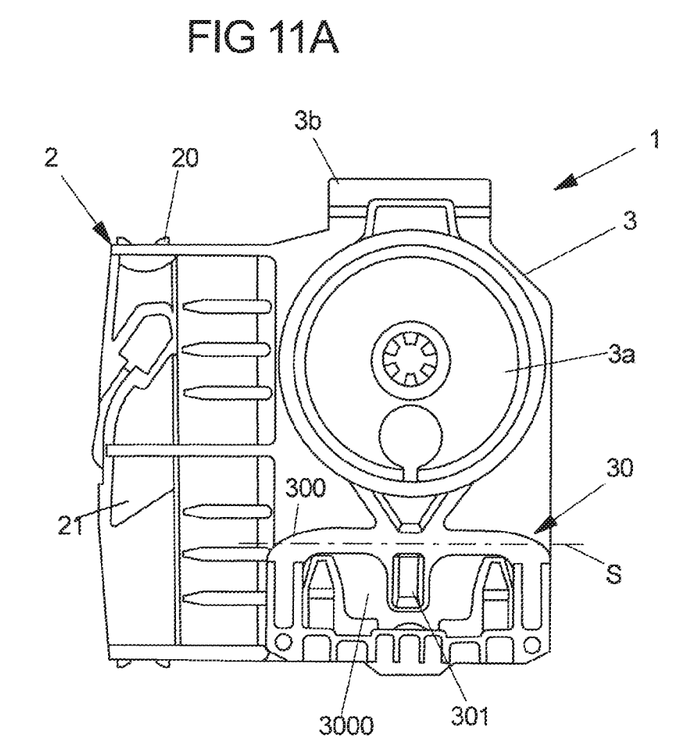
FIGS. 11A-11B show a further design variant of a proposed carrier which is of multi-part construction and in which a pivotable clamping part is mounted on a carrier body as a component of a separate part to which the other clamping part of the pane holder is molded.
Figure 11B:
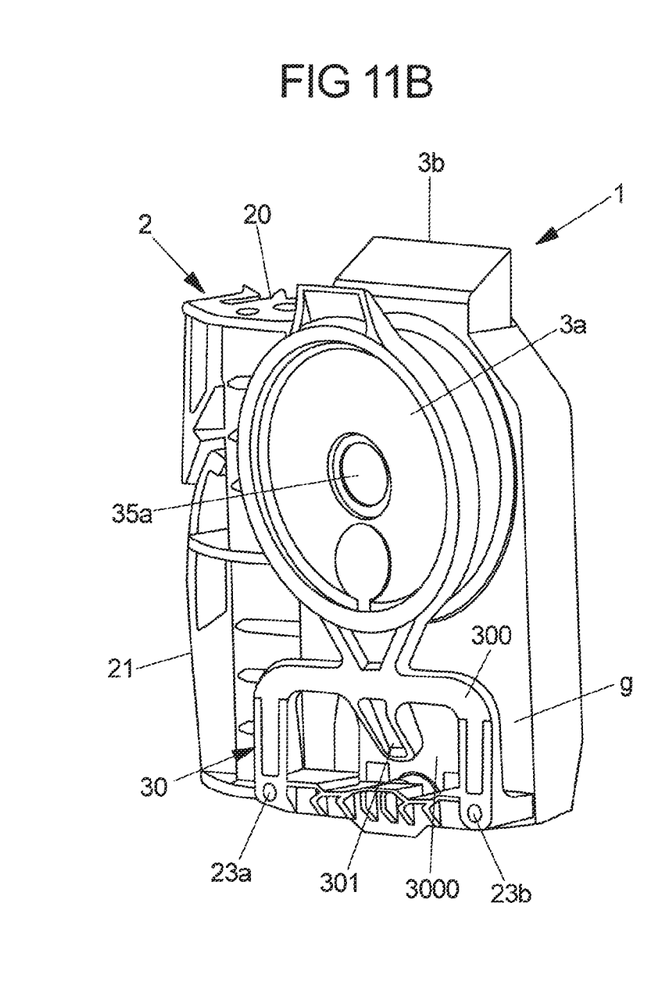

In the further design variant shown in FIGS. 11A and 11B the carrier 1 on the other hand is of multi-part design. The carrier 1 here consists of two parts, on the one hand the carrier body 2 with the (fixed) clamping part 3b integrally formed thereon and on the other hand a further part mounted to the carrier body 2, which includes the bearing portion 30 with the bearing bracket 300 and the pivotable clamping part 3a with the pivot pin 301 formed thereon. The second part of the two-part carrier 1, which includes the bearing portion 30 and the pivotable clamping part 3a, correspondingly forms one of two clamping sides of the pane holder 3. This part with the pivotable clamping part 3a is made separately, possibly of another material than the carrier body 2 with the other clamping side of the pane holder 3 integrally formed thereon with the clamping part 3b.

In this design variant the gap g for the window pane F to be connected to the carrier 1 only is obtained by assembling the parts of the carrier 1 and hence by joining the two parts, which each comprise one of the clamping parts 3a, 3b. For connecting the part including the pivotable clamping part 3a to the carrier body 2, the carrier body 2 in the design variant shown in FIGS. 11A and 11B forms a plurality of protruding connecting pins 23a and 23b. These connecting pins 23a and 23b engage into connecting openings that are formed on a base area of the bearing portion 30 when the carrier 1 is properly assembled. The carrier body 2 and the pivotable clamping part 3 and the part of the carrier 1 including the bearing portion 30 thus can be manufactured separately and subsequently be joined in order to manufacture the carrier 1. The connection of the two parts of the carrier 1, which each comprise a clamping part 3a and 3b, here is achieved via connecting elements positively engaging into each other, such as the connecting pins 23a and 23b. Alternatively or in addition, a cohesive connection of the parts manufactured separately can also be provided.

A window lifter in principle can comprise at least one of the illustrated carriers 1. In a design variant of a two-strand window lifter, in which two carriers 1 are shiftably held on two guide rails transversely spaced apart from each other, differently designed carriers 1 can also be provided. In particular, in such a two-strand window lifter a carrier 1 according to FIG. 1 to 8 or 9A to 9B, which includes a pane holder 3 fixed to a carrier body 2, can be arranged on a first guide rail, while a carrier 1 according to one of the design variants of FIG. 10A to 10B or 11A to 11B, in which at least one clamping part 3a is molded to the carrier body 2 and correspondingly is an integral component of the carrier body 2, is arranged on the other, second guide rail. On such a two-strand window lifter, different design variants of a proposed carrier thus can be combined with each other.

LIST OF REFERENCE NUMERALS 1 carrier
2 carrier body
20 guide portion
21 connecting portion
22 stop
23 holder portion
23a, 23b connecting pin
3 pane holder
3a, 3b clamping part
30 bearing portion
300 bearing bracket
3000 cutout
301 pivot pin (swivel element)
32 connecting portion
35a, 35b screw opening (fastening opening)
4 helical gear
5 screw (fastening element)
E insertion direction
F window pane
g gap
R swivel direction
S swivel axis
U pane lower edge

The invention claimed is:

1. A carrier for use in a vehicle window lifter configured to adjust a windowpane, the carrier comprising:
   a first clamping part;
   a second clamping part;
   a connecting portion connecting the first clamping part and the second clamping part, wherein the first clamping part and the second clamping part define a gap configured to receive a portion of the windowpane as the windowpane is inserted into the gap;
   a fastener extending between the first clamping part and the second clamping part;
   a bearing bracket extending between the first clamping part and the connecting portion and defining a cutout; and
   a swivel element extending from a portion of the bearing bracket into the cutout and protruding into the gap, wherein the swivel element is configured to swivel about a swivel axis defined by the portion of the bearing bracket so that as the windowpane is inserted into the gap, a distal end of the swivel element rotates away from the second clamping part so that the first clamping part pivots towards second clamping part.

2. The carrier of claim 1, wherein the swivel element is molded to the portion of the bearing bracket.

3. The carrier of claim 1, wherein the swivel element is configured to plastically deform as the windowpane is inserted into the gap and engages the swivel element.

4. The carrier of claim 1, wherein the portion of the bearing bracket defining the swivel axis is disposed between the second clamping part and the swivel element with respect to an insertion direction of the windowpane as the windowpane is inserted into the gap.

5. The carrier of claim 1, wherein the first clamping part and the second clamping part each define a fastening opening configured to receive the fastener.

6. The carrier of claim 1, wherein the fastener is a screw.

7. The carrier of claim 1, further comprising a carrier body provided with a guide portion, wherein at least a portion of the carrier is fixed to the carrier body, and wherein the carrier body is configured to move along a guide rail of the vehicle window lifter.

8. The carrier of claim 1, wherein the swivel element is configured to elastically deform as the windowpane is inserted into the gap and engages the swivel element.

9. A vehicle window lifter configured to adjust a windowpane, the vehicle window lifter comprising:
   a first clamping part;
   a second clamping part opposing the first clamping part and defining a gap configured to receive a portion of the windowpane as the windowpane is inserted into the gap along an insertion direction;
   a bearing bracket extending from the first clamping part along a first direction substantially parallel to the insertion direction;
   a swivel element extending from a portion of the bearing bracket in a first direction and protruding into the gap, wherein the swivel element is configured to swivel about a swivel axis defined by the portion of the bearing bracket so that as the window is inserted into the gap, a distal end of the swivel element rotates away from the second clamping part so that the first clamping part pivots towards second clamping part.

10. A method of assembling of a windowpane to the vehicle window lifter of claim 9, the method comprising:
    inserting a portion of the windowpane into the gap;
    rotating the distal end of the swivel element away from the second clamping part;
    pivoting the first clamping part towards the second clamping part about the swivel axis; and
    subsequently fastening a fastener to connect the first clamping part to the second clamping part.

11. The method of claim 10, wherein the rotating step includes deforming the portion of the bearing bracket.

12. The method of claim 10, further comprising:
    fastening a helical gear to a distal end of the fastener to clamp the windowpane between the first clamping part and the second clamping part.

13. The vehicle window lifter of claim 9, wherein the portion of the bearing bracket is configured to deform such that the swivel element pivots the second clamping part towards the first clamping part.

14. The vehicle window lifter of claim 9, wherein the swivel element is integrally molded with the portion.

15. The vehicle window lifter of claim 9, wherein the swivel element is disposed below the swivel axis.

16. The vehicle window lifter of claim 15, wherein the swivel element is a pin extending from the portion into the gap.

17. The vehicle window lifter of claim 15, wherein the bearing bracket includes a base and a pair of legs extending therefrom, wherein the swivel element is disposed between each of the legs of the pair of legs.

18. The vehicle window lifter of claim 9, further comprising:
    a fastener extending between the first clamping part and the second clamping part;
    a gear lying along the first clamping part and configured to rotate about the fastener to pivot the first clamping part towards the second clamping part.

* * * * *